United States Patent [19]

Cerny, Jr. et al.

[11] 4,369,520
[45] Jan. 18, 1983

[54] INSTANTANEOUSLY ACQUIRING SECTOR ANTENNA COMBINING SYSTEM

[75] Inventors: Frank J. Cerny, Jr., North Riverside; James J. Mikulski, Deerfield, both of Ill.

[73] Assignee: Motorola, Inc., Schaumburg, Ill.

[21] Appl. No.: 22,757

[22] Filed: Mar. 22, 1979

[51] Int. Cl.³ .......................... H04B 7/06; H04B 7/08
[52] U.S. Cl. .................................... 455/137; 455/33; 455/52; 455/276; 343/100 CS
[58] Field of Search ...................... 455/54, 52, 56, 57, 455/30, 33, 132, 101, 137, 141, 272, 273, 275, 276, 277, 278; 343/6.8 R, 100 CS, 100 ST

[56] References Cited

U.S. PATENT DOCUMENTS

| 3,472,788 | 10/1969 | Bickford . | |
|---|---|---|---|
| 3,743,941 | 7/1973 | Gans . | |
| 3,911,364 | 10/1975 | Langseth | 455/276 |
| 4,079,318 | 3/1978 | Kinoshita | 455/137 |
| 4,128,740 | 12/1978 | Graziano | 455/33 |
| 4,253,193 | 2/1981 | Kennard | 455/137 |

FOREIGN PATENT DOCUMENTS

| 993519 | 7/1976 | Canada . | |
|---|---|---|---|
| 2252195 | 3/1973 | Fed. Rep. of Germany | 455/52 |

OTHER PUBLICATIONS

Linear Diversity Combining Techniques, by Brennan, Proceedings of The IRE, Jun. 1950, pp. 1075-1101.
An Application for a Developmental Cellular Mobile & Portable Radio Telephone System, Submitted by American Radio Telephone Service, Inc.
AP-S International Symposium, AP-Session 5, 1640, May 17, pp. 118-121.

Primary Examiner—Tommy P. Chin
Attorney, Agent, or Firm—Rolland R. Hackbart; James W. Gillman

[57] ABSTRACT

A receiving system is disclosed that substantially instantaneously receives an RF signal. The inventive receiving system may be advantageously utilized at a central station of a mobile radio system for providing an omnidirectional receiving pattern. Both voice and digital information signals modulated on the RF signal transmitted from a mobile station are substantially instantaneously acquired by the central station. The receiving system includes an omnidirectional antenna configuration having a plurality of spatially disposed directional sector antennas, converting circuitry for converting the RF signals received by each directional sector antenna to an IF signal, IF bandpass filters for filtering each of the IF signals, and a maximal-ratio predetection diversity combiner for continuously combining the filtered IF signals to provide a composite IF signal so that any received RF signal is substantially instantaneously acquired. Because of the fast acquisition of RF signals, the receiving system will not lose the initial portion of voice and digital information signals modulated on an RF signal transmitted by a mobile station.

7 Claims, 2 Drawing Figures

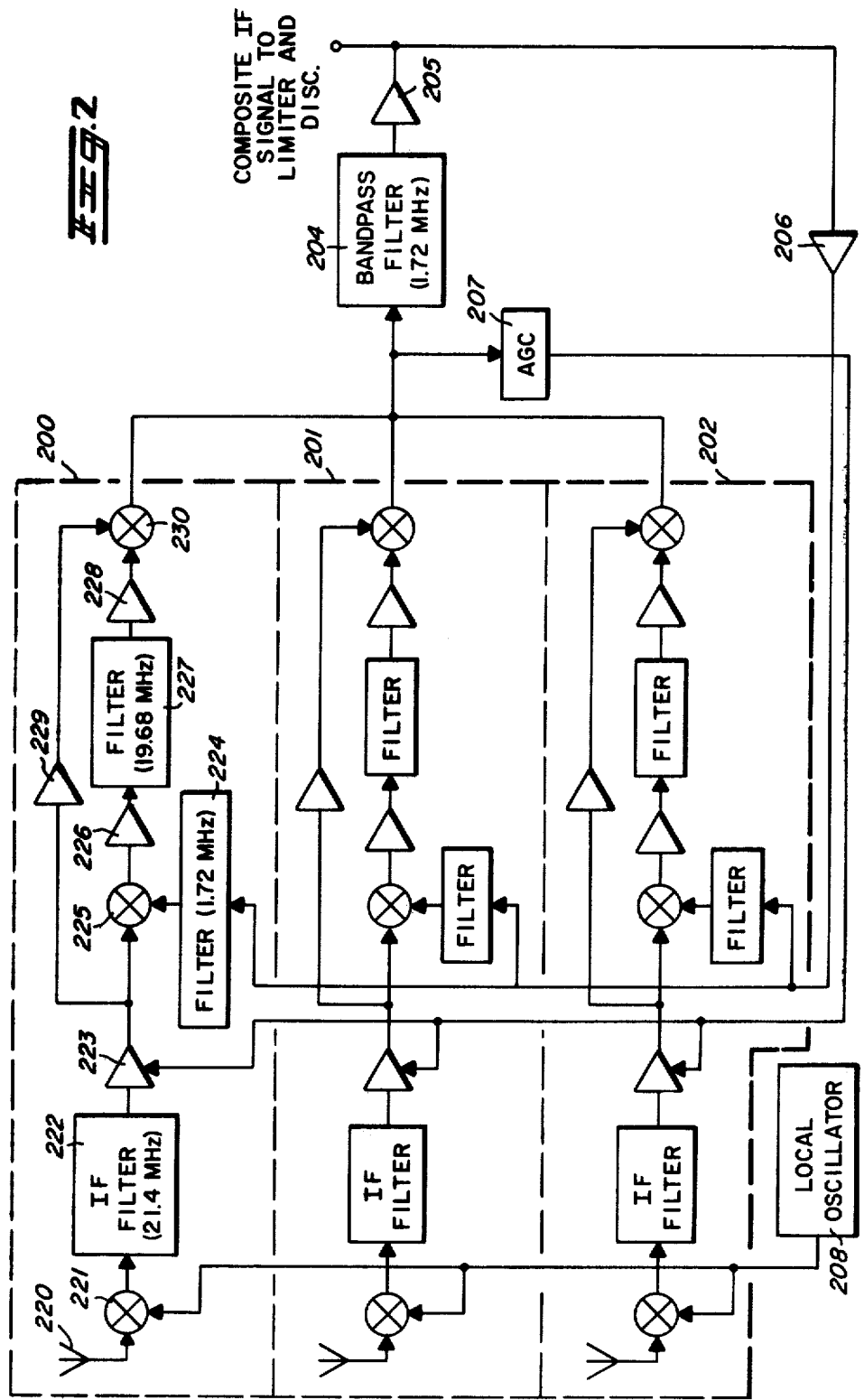

INSTANTANEOUSLY ACQUIRING SECTOR ANTENNA COMBINING SYSTEM

BACKGROUND OF THE INVENTION

The present invention relates to radio-frequency antenna combining systems and, more particularly, to a directional sector antenna combining system that provides an omnidirectional receiving pattern with substantially instantaneous acquisition of received radio frequency signals.

In order to provide a greater receiving coverage area for a radio station, a plurality of receiving antennas may be distributed throughout the coverage area, or a plurality of directional high-gain antennas arranged in an antenna system may be co-located near the center of the coverage area. In both of the foregoing instances, the received signals from the antennas may be combined at a central station to provide a composite signal or may be sampled in order to select the strongest of the received signals. For example, four spatially disposed omnidirectional antennas for receiving satellite signals have been combined in a shipboard receiving system. Another system, described in U.S. Pat. No. 4,128,740, provides at cellular antenna sites a plurality of sector antennas, each antenna accommodating RF signals for different radio channels.

However, when directional antennas have been utilized, prior art receiving systems have utilized antenna signal scanning methods instead of combining. An illustrative example is the antenna scanning system described in a paper by C. Chuag and R. Hollister, entitled "A New Multiple-Beam Antenna For 360 Degree Coverage", published in the 1978 International Symposium Digest on Antennas and Propagation by the IEEE at pp. 118-121. In an antenna scanning system, the central station chooses the antenna receiving the strongest signal by comparing the signal levels received on each directional antenna in succession. The sampling and comparing techniques required to select the directional antenna with the strongest signal require as much as 50 milliseconds per directional antenna. Thus, if six directional antennas are to be scanned, a total time of 300 milliseconds is required. A signal acquisition time of 300 milliseconds is not tolerable in some radio systems. For example, systems transmitting information in digital bit streams may loose some of the digital information because of a long signal acquisition time.

The signal acquisition time of a receiving system will be minimal when one omnidirectional receiving antenna is utilized. An omnidirectional antenna will exhibit considerably less antenna gain than a directional gain antenna having similar physical dimensions, however, resulting in a considerable reduction in the size of the receiving coverage area. Thus, none of the foregoing prior art receiving systems are capable of providing both a fast acquisition time to the received signal and a large omnidirectional receiving coverage area.

Accordingly, it is an object of the present invention to provide an improved instantaneously acquiring directional receiving antenna combining system having a large substantially omnidirectional receiving coverage area.

It is another object of the present invention to provide an improved instantaneously acquiring directional receiving antenna combining system that provides a space diversity improvement for voice channels by combining the RF signals received by each directional sector antenna of the antenna system.

SUMMARY OF THE INVENTION

According to the invention, there is provided a high-gain omnidirectional receiving system adapted to substantially instantaneously receive an RF signal. The receiving system includes an antenna configuration including a plurality of directional sector antennas for receiving an RF signal, converting circuitry coupled to the antenna configuration for converting each RF signal received by the directional sector antennas to a corresponding IF signal, filtering circuitry coupled to the converting circuitry for bandpass filtering each of the IF signals and a maximal-ratio predetection diversity combiner coupled to the filtering means for instantaneously acquiring to and combining the filtered IF signals to provide a composite IF signal. The directional antennas of the antenna configuration are spatially disposed in a predetermined arrangement to provide an omnidirectional receiving pattern. The directional antenna configuration provides more gain and, therefore, a greater receiving coverage area than would be obtainable by utilizing an omnidirectional antenna. The individual coverage area of each of the directional antennas may be separate from, or overlapping with, one another provided that a 360 degree omnidirectional coverage area is maintained. If a restricted coverage area encompassing less than a full 360 degree coverage area is desired, a plurality of directional sector antennas arranged so that their combined coverage patterns include only the desired coverage area, may be similarly utilized to provide instantaneous acquisition to a signal received by any of these directional antennas. In the maximal-ratio diversity combiner, each of the filtered IF signals are co-phased to a reference signal and essentially squared in amplitude prior to combination with one another. Because of the amplitude squaring, stronger IF signals receive more emphasis than weaker IF signals. Thus, the maximal-ratio diversity combiner continuously combines all of the IF signals regardless of their amplitudes.

BRIEF DESCRIPTION OF THE DRAWINGS

FIG. 2 is a more detailed block diagram of the diversity receiving system of FIG. 1.

DETAILED DESCRIPTION OF THE PREFERRED EMBODIMENT

Figure 1:
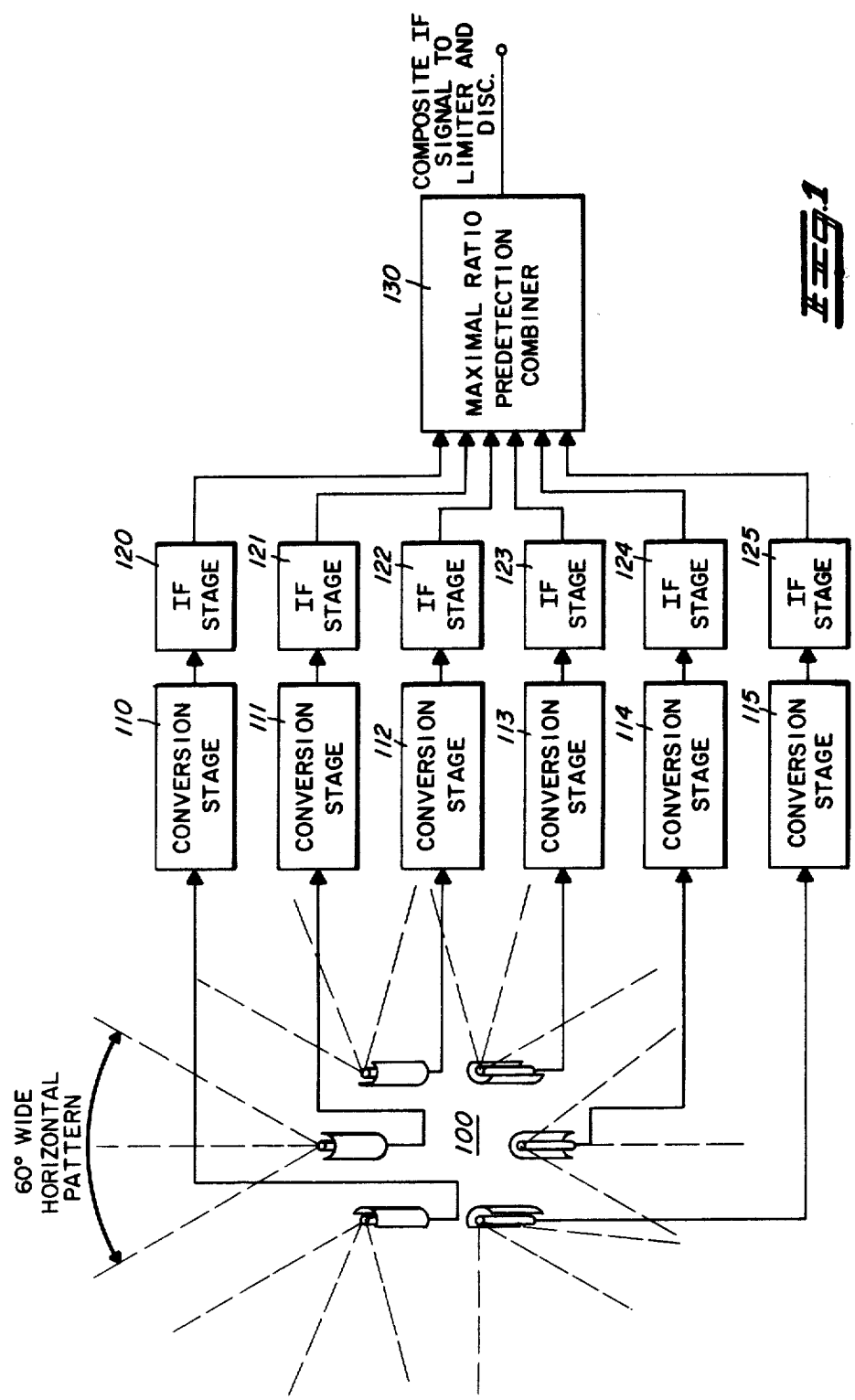
FIG. 1 is a block diagram of a diversity receiving system embodying the present invention.

In FIG. 1, there is illustrated a diversity receiving system including an antenna configuration 100 having six directional sector antennas, conversion stages 110-115, IF selectivity stages 120-125 and a 6-branch maximal-ratio predetection diversity combiner 130. The diversity receiving system of FIG. 1 may be advantageously utilized at the base station of a high-capacity radiotelephone system, such as the system described in the Federal Communications Commission filing by American Radio Telephone Service, Inc., of Baltimore, Md., entitled "An Application for a Developmental Cellular Mobile and Portable Radio Telephone System in the Washington-Baltimore Northern Virgina Area," filed on Feb. 14, 1977. In such a radio communications system, it is desirable that the base-station receiving system have a fast acquisition time to accommodate digital information signals, while still providing a wide omnidirectional receiving coverage area so that RF signals can be received regardless of the location of a transmitting mobile or portable station relative to the base station location.

Returning to FIG. 1, the antenna configuration 100 includes six directional sector gain antennas which each provide a 60-degree horizontal coverage pattern. All the conversion stages 110-115 are tuned to receive an RF signal at the same frequency; they all share a common local oscillator (see FIG. 2). All of the high-gain directional sector antennas are continuously capable of receiving a signal, and effectively provide a 360 degree omnidirectional coverage area. Furthermore, the 60 degree horizontal coverage patterns of each of the directional sector antennas may overlap one another without any degradation in system performance. The six antenna directional sector antenna configuration 100 provides for as much as an additional 7 dB of gain over that provided by an omnidirectional gain antenna of a similar physical length.

Due to reflections, scattering, and overlapping coverage of the directional antennas, an RF signal may be simultaneously received by a plurality of the directional antennas. The RF signals from each of the directional sector antennas are converted to IF signals by conversion stages 110-115, filtered by IF bandpass selectivity stages 120-125 and then applied to the maximal-ratio predetection combiner 130, which coherently combines the filtered IF signals to provide a composite IF signal. No sampling or comparing of the received RF signals is required as in the prior art. Instead, the IF signals are continuously combined by the combiner 130. Thus, a significantly faster acquisition time is realized since all of the RF signals from the directional sector antennas are substantially instantaneously acquired and continuously combined by the combiner 130. The receiving system of the present invention provides two major advantages over the prior art sampling and comparison techniques: Firstly, the total acquisition time required to detect the presence of an RF signal in any sector is limited only by the delay incurred by propagation through the receiving circuitry, which in the preferred embodiment of the present invention is less than 2 milliseconds. Secondly, since the RF signal path between a mobile station and the directional sector antenna configuration at the base station is frequently not line of sight, but rather consists of many randomly reflected and scattered paths, more than one of the directional sector antennas will frequently receive a usable signal. When the signal is received because of such reflected and scattered paths, the received signal will be randomly varying in both amplitude and phase; such variations may be approximated by a Rayleigh distribution. When several of the directional sector antennas receive usable signals, the maximal-ratio predetection diversity combiner 130 will co-phase and coherently sum the signals to provide the composite IF signal, which will be significantly better than the signal received on any one of the directional sector antennas alone. For example, empirical data has shown that a significant improvement in the bit error rate for digital information can be achieved even when the average RF signal level received on a second sector antenna is 10 dB lower than that received on a first sector antenna.

In FIG. 2, there is illustrated a more detailed block diagram of the receiving system of FIG. 1. The receiving system of FIG. 2 shows only three of the six branches shown in FIG. 1, although any number of branches may be utilized in practising the present invention. Branches 200, 201 and 202 are comprised of substantially identical circuitry, each branch providing a product signal that is both proportional to the square of the magnitude of the signal received by its respective sector antenna and phase coherent with the product signals from the other branches.

In the preferred embodiment, the frequency of local oscillator 208 determines to which radio channel the diversity receiver is tuned. The RF signal received by each branch sector antenna 220 is combined by mixer 221 with the signal from local oscillator 208 to provide an IF signal at 21.4 MHz. The IF signal from mixer 221 is then applied to IF bandpass filter 222, which may be a monolithic bandpass filter of the type similar to that described in U.S. Pat. No. 3,716,808. The filtered IF signal from filter 222 is then applied to intermediate frequency (IF) amplifier 223. The output from IF amplifier 223 is split and fed forward via two paths to mixer 230. The first portion of the IF signal is linearly amplified by amplifier 229 and thereafter applied to mixer 230. Amplifier 229 amplifies the first portion of the IF signal to provide a signal level that is within the input dynamic range of mixer 230. The second portion of the IF signal is applied to mixer 225 together with the 1.72 MHz amplitude-limited composite IF signal which is fed back via amplifier 206 and filter 224. By feeding back the IF signal, the IF strip of the diversity receiver forms a closed feedback loop that is regenerative on noise. Thus, the randomly varying phase of each branch IF signal relative to the composite IF signal is added into the closed loop at mixer 225 and then subtracted out at mixer 230. By this process, the random phase variations of each input IF signal relative to the composite IF signal are removed from each branch IF signal. The result is that all branch IF signals are cophased to the composite IF signal. Alternatively, in other embodiments, the branch IF signals need not be cophased with the composite IF signal, but may be cophased to a selected branch IF signal or to a locally generated reference signal.

Referring back to branch 200, the resultant output signal of mixer 225 is at the difference frequency of 19.68 MHz and has a relative phase which is the difference between the phase of the branch IF signal at 21.4 MHz and the composite IF signal at 1.72 MHz. This resultant output signal is linearly amplified by second IF amplifier 226 and applied to bandpass filter 227 to provide a variable phase shift to the resultant signal. Filter 227 is a two-pole crystal filter having a center frequency of 19.68 MHz and passband bandwidth of 2 KHz. The phase shift is a function of the absolute frequency of the resultant signal. The signal out of filter 227 is linearly amplified by third IF amplifier 228 to provide a signal level that is within the input dynamic range of mixer 230; this amplified signal is applied to the second input of mixer 230. Mixer 230 multiplies the amplified 19.68 MHz difference product signal from amplifier 228 with the amplified 21.4 MHz IF signal from amplifier 229 to provide a resultant output product signal having a 1.72 MHz difference frequency that is cophased with the composite IF signal, thus being substantially free of the random phase variations of the input IF signals. The phase difference resulting from mixer 225 is subtracted from the phase of the amplified 21.4 MHz IF signal from amplifier 229 to produce the 1.72 MHz difference product signal from mixer 230, which is cophased with the composite IF signal. The resultant output signal from mixer 230 is proportional to the square of the level of the input IF signal to that branch. The resultant output signals from the mixer 230 of each branch are added together to form one composite IF signal at 1.72 MHz. This composite IF signal is the output signal from the maximal ratio predetection diversity combiner; it is fed to a 1.72 MHz IF bandpass filter 204 and fourth IF amplifier 205. The composite IF signal from amplifier 205 may then be applied to a conventional demodulator that is appropriate for recovering the method of information modulation being utilized within the system. The composite IF signal from amplifier 205 is further amplified and then amplitude-limited by fifth IF amplifier 206 to provide a high-level amplitude-limited composite IF signal which is applied to each mixer 225 through each filter 224. Filter 224 may be either a bandpass filter or a low-pass filter having an operating frequency of 1.72 MHz. Automatic gain control is applied to all branches of the combiner by controlling the gain of each IF amplifier 223 with an AGC control voltage from AGC circuitry 207. This control voltage may be obtained by rectifying, amplifying, and low-pass filtering a portion of the composite IF signal from the output of mixer 230.

The present invention need not be limited to the maximal-ratio predetection diversity combiner illustrated in FIG. 2, but may advantageously utilize any suitable maximal-ratio predetection combiner. A number of different maximal-ratio predetection diversity combiners are described in U.S. Pat. No. 3,471,788 and in an article by D. Brennan entitled, "Linear Diversity Combining Techniques," published in IRE Proceedings, June, 1959, at pages 1075 to 1101. A maximal-ratio predetection combiner is preferable over an equal-gain predetection diversity combiner because an equal-gain combiner is susceptible to noise degradation when only one sector antenna is receiving a usable signal. Thus, the signal-to-noise ratio of the composite IF signal from an M branch equal-gain combiner will be degraded by M when only one sector antenna is receiving a usable signal. Under such conditions, as much as a 9 dB degradation would result for a 8-sector equal-gain combiner. Thus, in applications where the foregoing degradation in the signal-to-noise ratio of the desired signal would be detrimental to system performance, a maximal-ratio predetection diversity combiner would be preferable over an equal-gain predetection combiner.

In summary, a directional sector antenna combining system has been described which provides a substantially omnidirectional receiving pattern for instantaneously acquiring to a received RF signal, and, in addition, provides some diversity improvement in that the signals from the sector antennas receiving both strong and weak signals are combined to provide an improved composite signal. The foregoing improvements are attained in the preferred embodiment by utilizing an antenna configuration including six high-gain directional sector antennas and a 6-branch maximal-ratio predetection diversity combiner for cophasing and combining signals received by each of the directional sector antennas. The inventive directional sector antenna combining system may be advantageously utilized in any radio system where additional antenna gain is necessary for a wide receiving coverage area and where substantially instantaneous received signal acquisition times are required.

The scope of this invention should not be limited to systems providing only a substantially omnidirectional receiving antenna pattern. When a restricted coverage area encompassing less than a full 360 degree coverage area is desired, a plurality of directional sector antennas, their combined coverage patterns including only the desired coverage area, may be similarly utilized with a maximal ratio predetectin diversity combiner to provide instantaneous acquisition to a signal received by any of these directional antennas. Such restricted coverage systems clearly fall within the intended scope of this invention.

We claim:

1. A high-gain omnidirectional receiving system adapted to substantially instantaneously receive a radio frequency (RF) signal, having a predetermined frequency, said receiving system comprising:

antenna means including a plurality of directional antennas spatially disposed in a predetermined arrangement for providing a substantially omnidirectional receiving pattern, each of the directional antennas operating at the predetermined frequency for receiving an RF signal component substantially from a corresponding pre-established portion of the omnidirectional receiving pattern;

means coupled to the antenna means for converting the RF signal received by each directional antenna to a corresponding intermediate frequency (IF) signal;

means coupled to the converting means for filtering each of the IF signals; and maximal-ratio predetection diversity combining means coupled to the filtering means for substantially instantaneously acquiring the filtered IF signal of any corresponding received RF signal component, said maximal-ratio predetection diversity combining means comprising:

means for providing a reference signal having a predetermined reference frequency;

for each filtered IF signal: means coupled to the filtering means for dividing the filtered IF signal into first and second portions; first means for multiplying the first portion of the filtered IF signal with the reference signal to provide a first product signal having a phase that is the difference between the phase of the filtered IF signal and the reference signal; means for providing a variable phase shift to said first product signal, said phase shift being a function of the frequency of said first product signal; and second means for multiplying the second portion of the filtered IF signal and the phase-shifted first product signal to provide a second product signal that is substantially cophased with the reference signal and substantially independent of the phase of the filtered IF signal; and means for combining the second product signals for each corresponding filtered IF signal to provide a composite IF signal.

2. The receiving system according to claim 1, wherein each antenna is a directional gain antenna.

3. The receiving system according to claim 1, wherein, when a radio frequency (RF) signal is received by at least two of the directional antennas due to multiple signal paths caused by scattering, said maximal-ratio predetection diversity combining means substantially instantaneously coherently combines the plurality of corresponding filtered IF signals to provide the composite IF signal.

4. The receiving system according to claim 3, wherein each antenna is a directional gain antenna.

5. The receiving system according to claim 1, wherein the receiving patterns of each directional antenna predeterminedly overlap one another so as to provide overlapping signal reception on at least two directional antennas simultaneously, whereby said maximal ratio predetection diversity combining means substantially coherently combines the plurality of the corresponding filtered IF signals to provide the composite IF signal.

6. The receiving system according to claim 5, wherein each antenna is a directional gain antenna.

7. The receiving system according to claim 1, 3, or 5 for use in a base station of a mobile radio system for receiving voice and digital signals predeterminedly modulated on the RF signal, said base station including means for demodulating the composite IF signal to continously provide the demodulated voice and digital signals.

* * * * *